E. B. PRATER.
Ore Amalgamator.

No. 45,341.

Patented Dec. 6, 1864.

Witnesses:

Inventor:

UNITED STATES PATENT OFFICE.

ELI B. PRATER, OF WASHOE COUNTY, NEVADA TERRITORY.

IMPROVED MACHINE FOR COLLECTING AND AMALGAMATING GOLD AND SILVER.

Specification forming part of Letters Patent No. 45,341, dated December 6, 1864.

*To all whom it may concern:*

Be it known that I, ELI B. PRATER, of Washoe county, Territory of Nevada, have invented a new and improved machine for washing and concentrating sulphurets and tailings, whether of gold, silver, copper, or other metals, and for the saving of amalgam; and I do hereby declare that the following is a full and exact description thereof, reference being had to the accompanying drawings, and to the letters of reference marked thereon.

Figure 3:
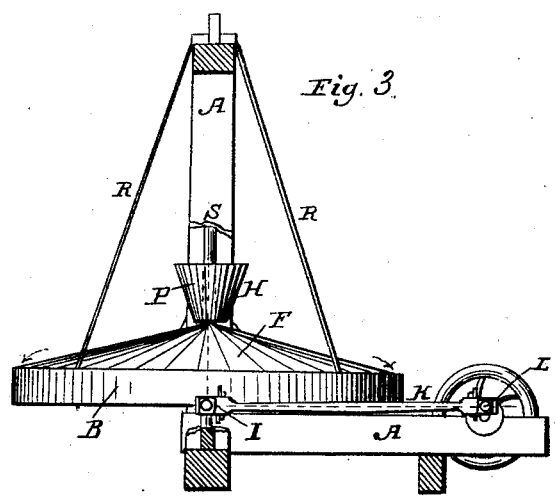
Figure 2:
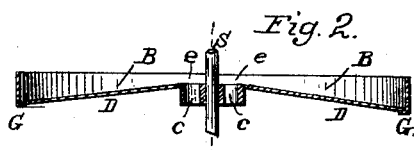
Figure 1:
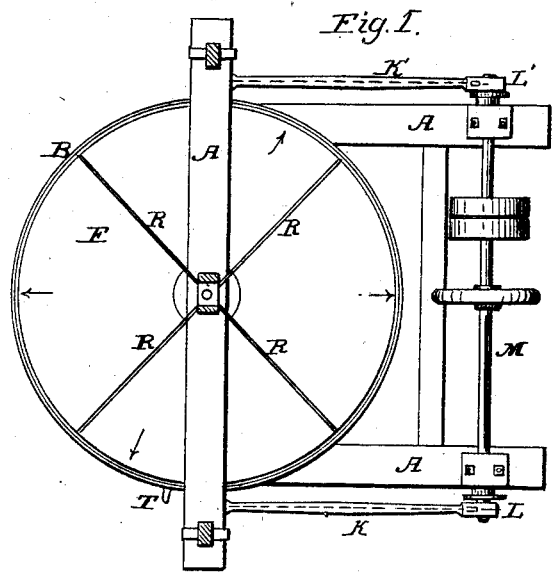

Figure 1 represents the machine viewed from above. Fig. 2 is a vertical section of the pan. Fig. 3 is a side representation, with a portion of the frame removed.

A is a frame of wood. B is a pan similar to the common amalgamating pan, and may be made of wood or metal. The bottom of the pan is convex, as shown at letter D, with a groove, G, at its outer or lower edge, with openings $c\ c$ near the center, surrounded by a rim or flange, $e$. I I' are lugs on opposite sides of the pan, terminating in balls which work in corresponding sockets on the connecting-rods K K'. S is an upright shaft, to which the pan is keyed. L L' are reversed cranks, to which the rods K K' are attached, driven by the shaft M. F is a hood or apron of sheet-iron, having a collar around the shaft S and suspended from the frame A by the rods R R. This apron or hood is circular, with an inclination toward the outer edge of the pan, with a small between its circumference and the edge of the pan. H is a funnel or hopper. P is a collar, with a flange at its lower edge, and slides up and down on shaft S. T is a plug for withdrawing amalgam.

Operation: The pan is oscillated by means of the shaft M, cranks L L', and connecting-rods K K'. The crushed ore, pulp, or sulphurets, mixed with water, flows through the funnel or hopper H, and falls upon the apron F, and, distributed thereon, passes over its edge, as shown by the arrows, into the pan B. The oscillatory motion of the pan causes the sulphurets or other matter to be washed to be strongly agitated at and near the circumference of the pan, while the motion at its center is very slight. It will be seen that the sulphurets, metal, and amalgam, being the heavier portion of the mass, will remain near the outer edge of the pan and will be retained there by the rim $x$. The agitation of the pan will throw the earthy and lighter particles to the center and through the openings $c\ c$, the rim or flange $e$ preventing the sulphurets, metal, or amalgam from passing out. The groove or gutter G, being at the lowest part, will collect all the amalgam, which can be drawn from the pan by removing the plug T. The quantity of pulp, &c., falling upon the apron F may be regulated by sliding the collar P up or down upon shaft S, the flange upon its lower edge increasing or diminishing the quantity.

What I claim as my invention, and for which I desire Letters Patent to issue, is—

In combination with the convex-shaped bottom of pan B, the outlets $c$, near the center of the pan, for the passage of earthy matter, the rim $x$, and the circumferential gutter $g$, for the collection of the amalgam, when used with or without the inner rim, $e$, as and for the purposes described.

ELI B. PRATER.

Witnesses:
E. A. ROWE,
H. M. MORGAN.